Patented June 10, 1941

2,244,769

UNITED STATES PATENT OFFICE 2,244,769

SUBSTITUTED HALO-PHENOL CARBOXYLIC ACIDS AND THEIR SALTS

George L. Doelling, St. Louis, Mo.

No Drawing. Application August 27, 1938, Serial No. 227,065

8 Claims. (Cl. 260—521)

This invention relates to compounds comprising substituted halo-phenol carboxylic acids and especially their salts which are particularly useful as antiseptics.

Many of the present types of antiseptics and disinfectant substances such as cresols, xylenols, amyl cresols, chlorthymol, and others are very poorly soluble in water. Some of these are soluble to the extent of only a few thousandths of one per cent in water at room temperature. While it is true that some solvent other than water may be used, it is likely that the antiseptic will be precipitated out of solution when its solvent is diluted by blood serum or other fluids. Since most bacteria live in an aqueous medium, an antiseptic should have a fair degree of solubility in water in order to reach the organisms. It is, therefore, an object of this invention to provide an antiseptic having the proper solubility in water.

It is another object of this invention to provide an antiseptic which does not have a bad odor characteristic of some of the present types.

It is also an object of this invention to provide an antiseptic which is not either strongly acidic or alkaline but is a substantially neutral substance. Many of the chlorine compounds such as NaOCl, chloramine T, and others are not always stable in solution and often deteriorate on the shelf so that there is always the danger of someone using a solution which has lost most of its free chlorine content and hence has no antiseptic value. A good antiseptic should, therefore, be a stable substance in solution and it is an object of this invention to provide an antiseptic fulfilling this requirement.

Other antiseptics such as hydrogen peroxide and iodine are vigorous oxidizing agents and their effectiveness is often wasted in oxidizing healthy tissues. It is, therefore, another object of this invention to provide an antiseptic which is not too vigorous an oxidizing agent.

For the purpose of illustration, I will now describe several examples of antiseptics which I have found to fulfill the above objects as well as methods of producing some of them, although it is to be understood that such disclosure is to be regarded as illustrative and not limitative.

I have found that certain of the substituted halo-phenol carboxylic acids and especially their salts provide antiseptics fulfilling the above objects. These compounds may be described by the following formula:

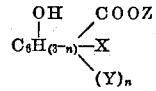

in which $C_6H_{(3-n)}$ may be a benzene nucleus, X a halogen, and Y an alkyl, aralkyl, aryl, alkoxy, or cycloalkyl group of which there may be one, two, or three for each molecule, the number of these substituent groups present per molecule being given by $n$. These alkyl groups need not be the same but there may be two or more different substituent groups in the same molecule. Z in the above formula may be a hydrogen or a nitrogen-containing basic radical or a metal not lower than zinc in the electromotive series and $n$ an integer not greater than three. The alkyl, aralkyl, aryl, alkoxy, and cycloalkyl-halo-phenol-carboxylic acids and especially their salts have been found to be especially valuable as antiseptics and disinfectants. The preferred compounds in this class are those in which the substituent alkyl, aralkyl, aryl, alkoxy, or cycloalkyl group or groups have a total of not less than three nor more than twelve carbon atoms per molecule.

I

Carboxylic acid of p-chlorothymol, having the following formula:

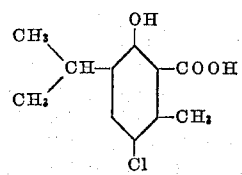

was made by reacting 60 grams of chlorthymol, 11.7 grams of NaOH, and 40 c. c. of water to form a sodium salt. Some xylene was then added to the sodium salt in a distilling flask and water completely removed by distillation. After all the water was removed, about 200 c. c. of ortho-dichlorbenzene was added and at 110° to 170° C., carbon dioxide was led in with the system under a pressure of about 40 inches of water over a period of about six hours. The product was recovered by the usual methods. It had a melting point of 161° to 162° C., and had the calculated neutralization value of chlorthymol carboxylic acid. A neutral solution of the sodium salt gave a bluish violet color with ferric chloride. Bacteriological tests of this compound in water solution showed that a solution of .75 gram of the acid in 100 c. c. of solution (present as sodium salt) killed both *B. typhosus* and *Staphylococcus aureus* in fifteen minutes. The ethylene diamine salt of this chlorthymol carboxylic acid was made by neutralizing the acid with ethylene diamine. A solution containing .3 gram of this acid in 100 c. c. of solution (present as the ethylene diamine salt) killed both of the above mentioned organisms in fifteen minutes. Instead of p-chlorothymol, chlor carvacrol can be used.

II

Chloro-para-tertiary-amyl-phenol-ortho-carboxylic acid having the following formula:

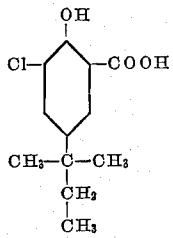

was made by chlorinating p-tertiary amyl phenol and then treating the chlor-p-tert-amyl-phenol with sodium hydroxide and $CO_2$ as in the above example. This ortho-chlor-para-tertiary-amyl-phenol-ortho-carboxylic acid had a melting point of 141.5° to 143° C., had the correct neutralization equivalent, and the neutral solution of its sodium salt gave a strong purplish violet color with ferric chloride. The sodium salt of this acid was made and tested in water solution against *B. typhosus* and *Staphylococcus aureus*. A solution containing .75 gram of the acid (present as its salt) per 100 c. c. of solution killed both these organisms in ten minutes. The ethylene diamine salt was made by neutralizing the acid with ethylene diamine. A solution containing about .55 gram of the acid (present as salt) in 100 c. c. killed both organisms in ten minutes.

Obviously, isomeric substances can be used, as for example, secondary amyl in place of tertiary amyl, etc. Likewise, bromine or iodine can be substituted for the chlorine, and benzyl, amoxy, cyclohexyl, or other radicals of similar nature can be substituted for the tertiary amyl and methyl-isopropyl given above. In the basic radical, calcium, magnesium, zinc, potassium, ammonium, butylamine, amylamine, alkylene diamines such as ethylene diamine or propylene diamine, and other basic substances can be used. In general though, the metals below zinc in the electromotive series are not suitable.

The compounds just described have antiseptic properties which recommend their use in various fields. Thus they may be used as disinfectants in place of cresylic acid or similar compounds, while at the same time, they may be used with advantage in lotions, antiseptic solutions, ointments, hair tonics, salves, creams, etc. These compounds may be used in a water solution, in dry form, or with a solvent such as alcohol or propanol. The particular form in which they are used will be determined by the nature of their use. They have been found particularly useful for killing or inhibiting the growth of bacteria, bacilli, and other micro-organisms either in contact with living tissues or as a general disinfectant. Because of the nature of the antiseptics thus provided, that is, their freedom from odor, stableness in solution, freedom from staining, water solubility, etc., many uses in addition to those enumerated will become apparent.

While I have described in some detail the preferred embodiments of my invention and some variations thereof, it will be understood that this is only for the purpose of making the invention clearer and it is not to be regarded as limited to the details described but is to be regarded as limited only by the terms of the accompanying claims in which it is my intention to claim all novelty inherent therein as broadly as is possible in view of the prior art.

I claim:

1. A chemical compound comprising a salt in which the acid radical is a substituted halophenol carboxylic acid containing at least one but not more than three substituent groups each of which is one of the group which consists of the alkyl, aralkyl, aryl, alkoxy and cycloalkyl groups, the total number of carbon atoms in the substituent groups being not less than three nor more than twelve per molecule, and in which the basic radical is one of the group consisting of hydrogen, an alkali-metal, an alkaline-earth-metal, ammonium, and a lower aliphatic amine.

2. As a new compound:

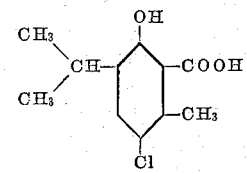

3. A compound having the formula

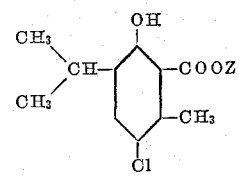

in which Z is a member of the class consisting of hydrogen, an alkali-metal, an alkaline-earth-metal, ammonium, and a lower aliphatic amine.

4. As an antiseptic an alkyl-substituted halo-salicylic acid in which the total number of carbon atoms in the alkyl group or groups is not less than three nor more than twelve per molecule.

5. A compound selected from the group consisting of an alkyl-substituted halo-salicylic acid, the total number of carbon atoms in the alkyl group or groups being not less than three nor more than twelve per molecule, and salts of the said acid.

6. As a new compound, ortho-chlor-para-tertiary-amyl-phenol-ortho-carboxylic acid.

7. A compound having the formula

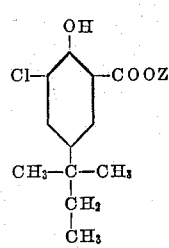

in which Z is a member of the class consisting of hydrogen, an alkali-metal, an alkaline-earth-metal, ammonium, and a lower aliphatic amine.

8. A chemical compound having the formula

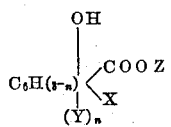

in which $C_6H_{(3-n)}$ is a benzene nucleus, COOZ is a radical in which Z is a member of the class consisting of hydrogen, an alkali-metal, an alkaline-earth-metal, ammonium, and a lower aliphatic amine, X is a halogen, Y is a substituent radical which is one of the group consisting of the alkyl, aralkyl, aryl, alkoxy, and cycloalkyl radicals, $n$ is an integer not greater than three, and the total number of carbon atoms in the substituent groups in $(Y)_n$ is not less than three nor more than twelve per molecule.

GEORGE L. DOELLING.